United States Patent [19]

Ogihara et al.

[11] 4,127,984

[45] Dec. 5, 1978

[54] SLIP MECHANISM OF CLOCK

[75] Inventors: Masuo Ogihara; Kozo Chimura; Nobuo Shinozaki, all of Yotsukaido, Japan

[73] Assignee: Seiko Koki Kabushiki Kaisha, Japan

[21] Appl. No.: 772,566

[22] Filed: Feb. 28, 1977

[30] Foreign Application Priority Data

Feb. 26, 1976 [JP] Japan ............................ 51-22302[U]
Mar. 3, 1976 [JP] Japan ............................ 51-25097[U]

[51] Int. Cl.[2] ...................... G04B 13/02; G04B 33/00; F16D 7/02

[52] U.S. Cl. ......................................... 58/7; 58/23 D; 58/59; 58/139; 64/30 E

[58] Field of Search .................. 58/7, 23 D, 22.5, 59, 58/68, 85.5, 125 R, 125 B, 125 A, 138, 139; 64/30 D, 30 E, 3 DE

[56] References Cited

U.S. PATENT DOCUMENTS

| | | | |
|---|---|---|---|
| 439,845 | 11/1890 | Learned | 58/138 |
| 911,534 | 2/1909 | Alford | 58/7 |
| 2,616,240 | 11/1952 | Blough | 58/7 |
| 3,618,310 | 11/1971 | Balchunas | 64/30 D |

*Primary Examiner*—Edith S. Jackmon
*Attorney, Agent, or Firm*—Robert E. Burns; Emmanuel J. Lobato; Bruce L. Adams

[57] ABSTRACT

A slip mechanism in the gear train of a clock comprises a gear wheel and an associated pinion coaxial with the gear. The gear wheel and pinion have interengaging surfaces for centering and rotatively guiding them relative to one another. A circle of resilient fingers on one of the gear wheel and pinions resiliently, frictionally and radially engage an annular friction surface of the other to provide a frictional coupling between them. Moreover hooks on the fingers retain the gear wheel and pinion in assembled relation to one another. In one embodiment the resilient fingers are integral with the pinion and are received in a concentric opening in the gear wheel of lesser diameter than a circle defined by the fingers in relaxed conditions. In another embodiment the resilient fingers are integral with the gear wheel and engage the outside of a concentric flange on the pinion of larger diameter than a circle defined by the fingers in relaxed condition. The pinion and gear can readily be formed of plastic material thus providing an inexpensive slip mechanism which can be easily assembled.

7 Claims, 6 Drawing Figures

SLIP MECHANISM OF CLOCK

FIELD OF INVENTION

The present invention relates to a slip mechanism for a clock so as to provide a frictional coupling between two members of a gear train of the clock.

BACKGROUND OF THE INVENTION

In the prior art a slip mechanism gear is usual placed on a pinion and is coupled thereto by being urged strongly toward the pinion by a spring with a cork facing between the gear and the pinion so as to provide a frictional coupling between them. This method however has a disadvantage from the point of view of economy since it is necessary to provide a cork friction surface between the gear and the pinion.

As another prior art method it is known to form a metal gear and to integrate the metal gear with the pinion by molding with a plastic material. In this method however the slip torque is obtained by a holding force produced between the metal and plastic at the time of molding. Therefore the slip torque is subject to great variations with slight changes of the plastic.

In prior art slip mechanisms in which one or both of the pinion and gear are made of metal it has been necessary to resort to mechanical coupling means and also lubrication is required for the purpose of stabilizing the slip torque.

SUMMARY OF THE INVENTION

It is an object of the present invention to eliminate the drawbacks and disadvantages of the prior art by providing a slip mechanism which is inexpensive and permits coupling with a simple operation. Moreover according to the invention both the pinion and the gear can readily be formed of plastic material thus providing an inexpensive slip mechanism which can be easily assembled and which eliminates the need of oiling by means of a combination of suitable plastic materials or by using a material containing a lubricant.

In accordance with the invention the slip mechanism of a clock comprises a gear and a pinion forming part of the gear train of the clock. The gear and pinion have interengaging circular guide portions for centering and rotatively guiding the gear and pinion relative to one another. One of the gear and pinion has an annular friction surface concentric thereto while the other of said gear and pinion has integral resilient fingers which resiliently, frictionally and radially engage the annular friction surface to provide a frictioning coupling between the gear and the pinion. Moreover hook portions on the resilient fingers retain the gear and pinion axially in assembled condition.

In one embodiment of the invention the resilient fingers are integral with the pinion and are received in a concentric opening in the gear of a lesser diameter than a circle defined by the resilient fingers in relaxed condition. In another embodiment the resilient fingers are integral with the gear and engage the outside of a concentric flange of the pinion having an outside diameter greater than the diameter of a circle defined by the fingers in relaxed condition.

BRIEF DESCRIPTION OF DRAWINGS

The nature, objects and advantages of the invention will be more fully understood from the following description of preferred embodiments disclosed by way of example in the accompanying drawings in which.

DESCRIPTION OF PREFERRED EMBODIMENTS

Figure 1:
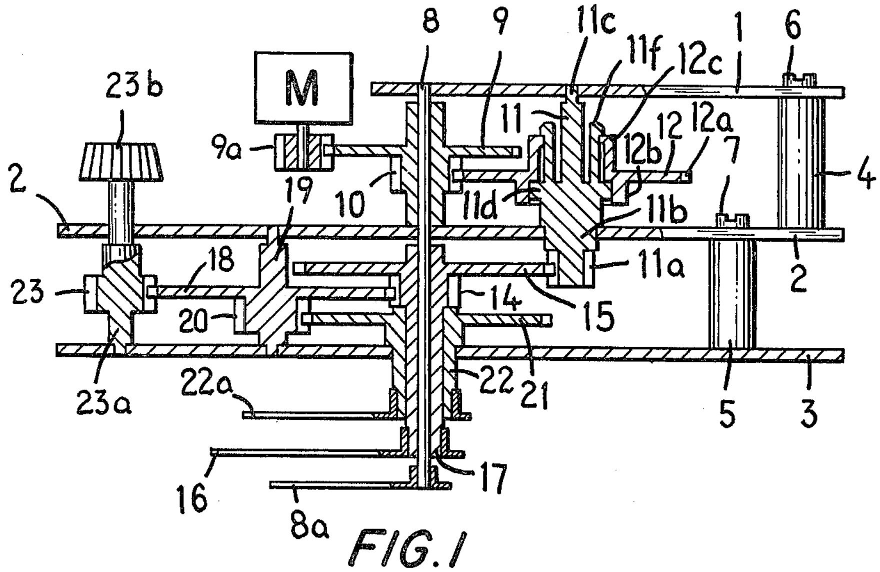
FIG. 1 is a sectional view showing one embodiment of a slip mechanism in accordance with the invention.
Figure 2:
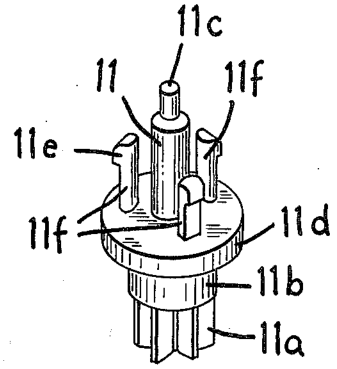
FIG. 2 is a perspective view showing a part of the slip mechanism of FIG. 1, the same part also being in the embodiment of FIG. 5.
Figure 3:
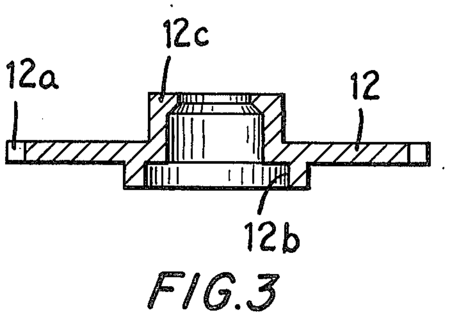
FIG. 3 is a sectional view of another part of the slip mechanism of FIG. 1, the same part being in the embodiment of FIG. 5.

Referring first to the embodiment of the invention shown in FIGS. 1–3, an upper plate 1, an intermediate plate 2 and a lower plate 3 for rotatably supporting a gear train are secured to one another, for example by posts 4 and 5 and screws 6 and 7. A second hand shaft 8 is rotatably supported by the upper and intermediate plates 1 and 2 and a second hand wheel 9 and an integral first pinion 10 are secured to the second hand shaft 8. The second hand wheel 9 is driven by a pinion 9*a* of a motor M. A shaft 11 which is parallel to and spaced from the second hand shaft 8 is rotatably supported by the upper plate 1 and intermediate plate 2. The shaft 11 is provided at its lower end with an integral second pinion 11*a* in mesh with a minute hand gear wheel 15 as will be described below. The shaft 11 further rotatably and frictionally supports a first intermediate gear 12 in mesh with the pinion 10 of the second hand wheel 9.

The structure for frictionally coupling the first intermediate gear 12 with the pinion 11*a* to provide a slip mechanism for the gear train of the clock will now be described with reference to FIGS. 1, 2 and 3. Immediately above the second pinion 11*a* the shaft 11 is formed with a rotary bearing section 11*b* which is rotatably supported in a hole provided in the intermediate plate 2. A shoulder on the shaft 11 engages the upper side of the intermediate plate 2 to support the shaft in an axial direction. The upper tip of the shaft 11 is provided with a second rotary bearing section 11*c* which is rotatably supported in a hole provided in the upper plate 1. Adjacent the rotary bearing section 11*c* the shaft 11 is formed with a second shoulder engagable with the underside of the upper plate 1 so as to retain and position the shaft in an axial direction.

An intermediate portion of the shaft 11 is formed with a rotary guide flange 11*d* from the upper face of which three integral upright and flexible fingers 11*f* project. An outwardly projecting hook 11*e* is formed at the tip of each of the flexible fingers 11*f*.

With reference to FIG. 3the outer periphery of the intermediate gear 12 is provided with gear teeth 12*a* which mesh with the first pinion 10. A central portion of the intermediate gear 12 is formed with an annular flange providing a guide section 12*b* rotatably supported by engagement with the flange 11*d* of the shaft 11 so as to center and rotatively guide the first intermediate gear 12 with respect to the pinion 11*a* of the shaft 11. The intermediate gear 12 is further provided with an upwardly projecting collar portion which provides an annular frictional surface 12*c* adapted to be frictionally engaged by the integral resilient fingers **11*f* of the shaft 11**.

By fitting the first intermediate gear 12 on the shaft 11 from the top thereof the first guide section **12*b* is engaged with and rotatably supported by the flange 11*d* of the shaft 11 so as to center the gear relative to the shaft and also to position it axially. Meanwhile the flexible fingers 11*f* are slightly flexed inwardly and are held in elastic contact with the frictional surface 12*c* by the resilience of the fingers. In other words, the inner diameter of the frictional surface 12*c* is made slightly smaller than the outer diameter of the circle defined by the integral flexible fingers 11*f*. At the same time the hooks 11*e* on the tips of the flexible fingers engage the end of the collar of the intermediate gear 12 providing the frictional surface 12*c* so that the gear can no longer be withdrawn from the shaft 11. Thus the hooks 11*e* together with the flange 11*d* of the shaft 11 position the first intermediate gear 12 in an axial direction relative to the shaft 11 and retain the gear 12 and the shaft 11 with its pinion 11*a*** in assembled condition.

Continuing with a description of the gear train shown in FIG. 1, the minute hand gear wheel 15 is fixed on or integral with a hollow shaft 17 on the end of which there is fixed a minute hand 16. The minute hand gear wheel 15 has a pinion 14 which meshes with a second intermediate gear wheel 18 secured to a shaft 19 which is parallel to and spaced from the second hand shaft 8 and is rotatably supported by the intermediate plate 2 and lower plate 3. The second intermediate gear wheel 19 has a pinion 20 which meshes with an hour hand gear wheel 21 which is integral with or secured to an hour hand pipe 22 rotatably supported by the lower plate 3 and by the minute hand shaft 17. An hour hand **22*a* is provided on the lower end of the hour hand pipe 22 and a second hand 8*a* is fixed on the lower end of the second hand shaft 8**.

A time correction gear wheel 23 in mesh with the second intermediate gear wheel 18 is fixed on a shaft **23*a* rotatably supported by the intermediate plate 2 and lower plate 3 and rotatable by a knob 23*b*** provided at its upper end.

If the slip torque provided in the gear train by the frictional coupling between the pinion **11*a* and the first intermediate gear 12 is less than the static slip output of the motor M the first intermediate gear wheel 12 will slip with respect to the shaft 11 when a user rotates the time correction wheel 23 for correcting time so that only the pinion 11*a*, minute hand gear wheel 15** and subsequent gear wheels of the gear train are rotated in the setting operation.

A second embodiment shown in FIG. 4 will now be described. This embodiment is a modification of the slip mechanism of the embodiment shown in FIG. 1. The other parts of the gear train are similar to those of the first embodiment and hence will not be further described.

Figure 4:
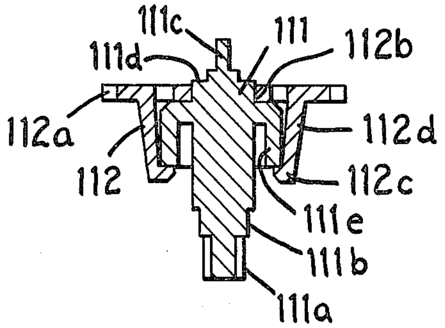
FIG. 4 is a partial sectional view showing a second embodiment of the invention.

The slip mechanism of the embodiment illustrated in FIG. 4 comprises a shaft 111 which is formed at its lower end with an integral second pinion **111*a*. Immediately above the pinion shaft 111 is formed with a rotary bearing section 111*b* which is rotatably supported in a hole provided in the intermediate plate 2. The tip at the upper end of the shaft 111 is formed with a second rotary bearing section 111*c* which is rotatably supported by a hole provided in the upper plate 1. An intermediate portion of the shaft 111 is formed with a rotary guide section 111*d* and a downwardly extending cylindrical collar or flange 111*e***.

The slip mechanism further comprises a first intermediate gear wheel 112 provided at its periphery with gear teeth **112*a* in mesh with the second hand gear wheel pinion 10 (FIG. 1). At its center the first intermediate gear wheel 112 is formed with a guide hole 112*b* which is rotatably supported by the rotary guide section 111*d* of the shaft 111. At its intermediate portion the first intermediate gear wheel 112 is formed with a plurality of downwardly extending integral flexible fingers 112*d* which frictionally engage the flange 111*e* of the shaft 111. Moreover each of the fingers 112*d* is provided at its tip with an inwardly projecting hook 112*c* which engages the lower end of the flange 111*e***.

When the shaft 111 is inserted into the gear wheel 112 from below, the fingers **112*d* are flexed outwardly and embrace and frictionally engage the flange 111*e* of the shaft 111. Since the fingers 112 by their inherent resiliency are held in pressure contact with the outer surface of the flange 111*e* of the shaft 111 the gear 112 is frictionally coupled with the shaft 111 with a constant slip torque. The gear 112 is centered with respect to the shaft 111 by engagement of the central opening 112*b* of the gear with the rotary guide section 111*d* of the shaft 111. Moreover the gear 112 engages the upper face of the flange 111*e* while the hooks 112*c* on the fingers 112*d* hook over the lower end of the flange 111*e* so as to position the gear 112 and the shaft 111** axially with respect to one another and to hold them in assembled condition.

A third embodiment of the invention will now be described with reference to FIG. 5. This embodiment is a modification of the first embodiment with respect to the slip mechanism. The other parts of the gear train are similar to those of the first embodiment and will not be further described.

Figure 5:
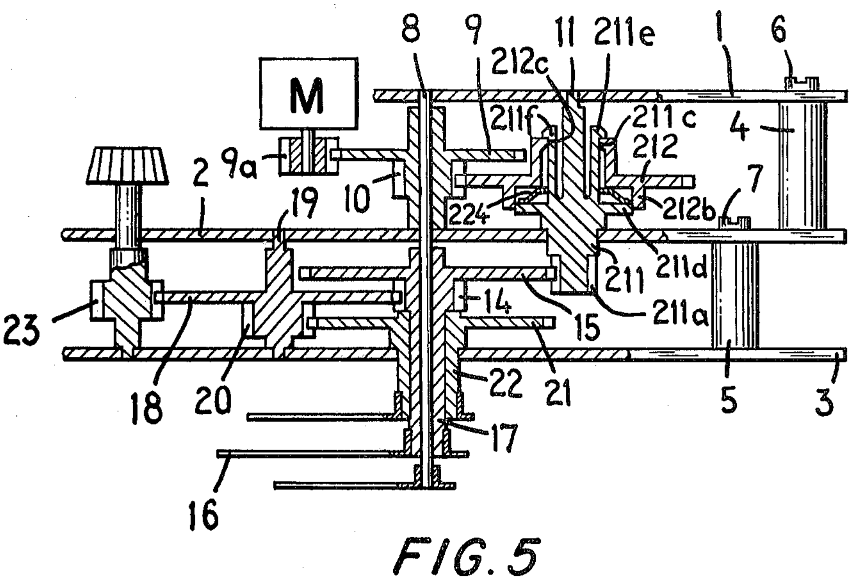
FIG. 5 being a sectional view of a third embodiment.

In the embodiment illustrated in FIG. 5, a leaf spring 224 is provided between the first intermediate gear 212 and a rotary guide flange **211*d* of the shaft 211. The spring 224** is an annular leaf spring having a doughnut-like plan view and a substantially U-shaped profile in section.

The annular spring 224 is first fitted over the three integral flexible fingers **211*f* and laid on the flange 221*d* of the shaft 211. Then the first intermediate gear wheel 212 is fitted on the shaft 211 from above whereby the flexible fingers 211*f* of the shaft 211 are flexed inwardly permitting the hole 212*c* of the intermediate gear wheel 212 to pass over the hooks 211*e* of the flexible fingers 211*f* and thereupon permitting the flexible fingers 211*f* to be restored by their resiliency toward their initial position, the hooks 211*e* snapping over the end of the flange providing the friction surface 211*c***.

A constant gap is formed between the top of the flange **211*d* of the shaft 211 and the lower surface of the gear 212 with the spring 224 clamped in this gap and exerting a force urging the gear 212 upwardly against the hooks 211*e* of the flexible fingers 211*f*. In this way the first intermediate gear 212 and shafts 211 are coupled by simple manual operation without any mechanical coupling operation and provide a constant slip torque between the gear 212 and the integral pinion 211*a* of the shaft 211. Moreover the gear 212 is centered with respect to the shaft 211 by a downwardly projecting flange 212*b* on the gear rotatively engaging the flange 211*d* of the shaft 211**.

Figure 6:
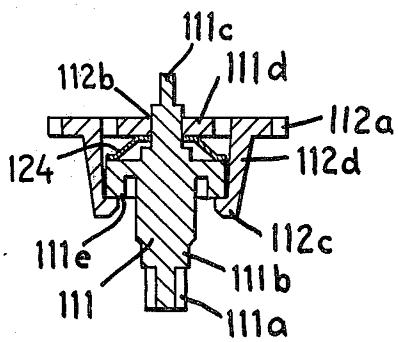
FIG. 6 being a partial sectional view of a fourth embodiment of the invention.

FIG. 6 shows a fourth embodiment of the invention in which the slip mechanism is similar to that shown in FIG. 4 except that an annular leaf spring 324 is provided between the pinion and the gear. The spring 324 has a doughnut-like shape in plan view and is substantially U-shaped in sectional profile. The spring is first laid on the flange 111*e* of the shaft 111 and the shaft 111 is inserted into the gear 112 from below whereby the integral flexible fingers 112*d* are flexed outwardly to embrace and frictionally engage the flange 111*e* of the shaft 111. In this way the gear 112 and the shaft 111 with its integral pinion 111*a* are frictionally coupled together. A constant gap is formed between the upper surface of the flange 111*e* of the shaft and the lower surface of the gear 112. The annular leaf spring 124 is received in this gap. Since the spring 124 is set to have a height slightly greater than that of the space when the spring is in relaxed condition, the spring 124 is flexed to a constant extent by its confinement in the space. Thus a constant pressure is provided between the gear 112 and the shaft 11 by the spring 124 thereby providing a constant slip torque between them.

While in the embodiments illustrated in the drawings and described, the slip mechanism is provided between the first intermediate gear and its associated pinion, similar effects can be obtained by providing the slip mechanism between other elements of the gear train, for example between the minute hand gear wheel and pinion. It will be recognized by those skilled in the art that other modifications may be made and that the invention is thus in no way limited to the embodiments shown by way of example in the drawings and herein described.

What is claimed is:

1. A slip mechanism for a clock having a gear train, said slip mechanism comprising in said gear train a gear and a pinion integral with a shaft coaxial with said gear, said gear and pinion having interengaging circular guide portions for centering and rotatively guiding said gear and pinion relative to one another, one of said gear and pinion having an annular circular friction surface concentric with said shaft and the other of said gear and pinion being formed of plastic material in one piece with resilient finger means which extend axially therefrom and which resiliently, frictionally and radially engage said annular friction surface to frictionally couple said gear and pinion with one another.

2. A slip mechanism according to claim 1, in which said resilient finger means comprises a plurality of resilient fingers arranged in a circle and having at their ends hook portions for retaining said gear and pinion axially in assembled condition.

3. A slip mechanism according to claim 2, further comprising spring means acting in an axial direction between said gear and pinion in opposition to said hook portions of said fingers.

4. A slip mechanism according to claim 2, in which said resilient fingers are integral with said pinion and are received in a concentric opening in said gear of lesser diameter than the circle defined by said resilient fingers in relaxed condition.

5. A slip mechanism according to claim 2, in which said resilient fingers are integral with said gear and engage the outside of a concentric flange of said pinion having an outside diameter greater than the diameter of a circle defined by said fingers in relaxed condition.

6. A slip mechanism according to claim 1, in which said resilient finger means comprise a plurality of resilient fingers integral with said pinion and received in a coaxial opening in said gear.

7. A slip mechanism according to claim 1, in which said pinion has a concentric flange constituting said friction surface, and in which said resilient finger means comprise a plurality of resilient fingers integral with said gear and disposed around said concentric flange of said pinion.

* * * * *